US009182752B2

(12) United States Patent
Blevins et al.

(10) Patent No.: US 9,182,752 B2
(45) Date of Patent: Nov. 10, 2015

(54) METHOD AND SYSTEM FOR MULTI-ZONE MODELING TO DETERMINE MATERIAL PROPERTIES IN STORAGE TANKS

(75) Inventors: Terrence L. Blevins, Round Rock, TX (US); Wilhelm K. Wojsznis, Austin, TX (US); Christopher J. Worek, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1055 days.

(21) Appl. No.: 13/103,432

(22) Filed: May 9, 2011

(65) Prior Publication Data

US 2011/0288786 A1 Nov. 24, 2011

Related U.S. Application Data

(60) Provisional application No. 61/347,208, filed on May 21, 2010.

(51) Int. Cl.
*G05B 17/02* (2006.01)
*G05B 13/04* (2006.01)
(52) U.S. Cl.
CPC ............. *G05B 17/02* (2013.01); *G05B 13/048* (2013.01)
(58) Field of Classification Search
CPC ............................ G01B 13/048; G05B 17/02
USPC ........................................................ 702/22
See application file for complete search history.

(56) References Cited

U.S. PATENT DOCUMENTS

2009/0266891 A1 10/2009 Santucci et al.
2010/0318934 A1 12/2010 Blevins et al.

FOREIGN PATENT DOCUMENTS

| GB | 2 430 763 A | 4/2007 |
| JP | 2005263486 A | 9/2005 |
| WO | WO-2007/008744 A2 | 1/2007 |

OTHER PUBLICATIONS

Boudreau et al., *New Directions in Bioprocess Modeling and Control*, Chapter 8, "Multivariate Statistical Process Control," ISA, Research Triangle Park, NC, 2006.
Chiang et al., *Fault Detection and Diagnosis in Industrial Systems*, Chapter 1.3, "Process Monitoring Methods," Springer, 2001.
Seborg et al., *Process Dynamics and Control*, Chapter 2, "Theoretical Models of Chemical Processes," John Wiley & Sons, Inc., 2004.

(Continued)

*Primary Examiner* — Janet Suglo
(74) *Attorney, Agent, or Firm* — Marshall, Gerstein & Borun LLP

(57) ABSTRACT

In a batch process control system employing storage tanks without mixers, properties of the storage tank pump out feedstock may be modeled to more accurately control the quality of a process. This model may not require the measurement of input or pump out flow or assume perfect blending. Rather, the developed model may assume that feedstock input into a storage tank may remain layered with some mixing due to continuous convection, turbulence during loading, or other factors. The model may include a projection of the properties describing a storage tank layer of input material into the model. For each new load of storage tank input feedstock, model zones may be shifted and the zone from which the feedstock is drawn may be updated with the properties from the new load.

26 Claims, 9 Drawing Sheets

(56) References Cited

OTHER PUBLICATIONS

Wojewodka et al., "Benefits Achieved Using On-Line Data Analytics," Emerson Exchange, 2009.
Wojewodka et al., "Benefits Achieved Using Online Analytics in a Batch Manufacturing Facility," WBF, Austin, TX, May 2010.
Wojewodka et al., "Data Analytics in Batch Operations," Control Magazine, May 2008.
Wojsznis et al., "Batch On-line Analytics—a Solution Beyond Six Sigma," ISA, World Batch Forum (WBF), Barcelona, Spain, Nov. 2008.
Search Report for Application No. GB1108174.2, dated Sep. 20, 2011.
Chinese Office Action dated Jan. 23, 2015 for Chinese Patent Application No. 201110138255.0, 15 pages.
Notice of Reasons for Rejection, Japanese Patent Application No. 2011-114712, mailed Mar. 10, 2015.

| | 502 | | | | 506 | 508 | |
|---|---|---|---|---|---|---|---|
| | Property 1 | Property 2 | Property 3 | Property 4 | Property N | AMOUNT | TIME | ZONE |
| | 165 | 2 | .075 | no | A | 56 | 095578 | 1 |
| | 169 | 4 | .070 | yes | B | 12 | 099612 | 2 |
| | 155 | 3 | .089 | no | A | 67 | 102259 | 3 |
| | 166 | 5 | .088 | yes | A | 10 | 112556 | 4 |
| | 172 | 4 | .073 | yes | C | 60 | 112596 | 5 |

| Lab Q | P | A | Q-P | A-P |
|---|---|---|---|---|
| 366.4 | 381.3 | 419.985 | -14.9 | 38.685 |
| 365.6 | 381.3 | 419.985 | -15.7 | 38.685 |
| 366.2 | 381.3 | 420.3 | -15.1 | 39 |
| 366.8 | 381.3 | 419.7825 | -14.5 | 38.4825 |
| 365.6 | 389.5 | 419.625 | -23.9 | 30.125 |
| 367.36 | 381.3 | 418.5 | -13.94 | 37.2 |
| 367.6 | 381.3 | 422.325 | -13.7 | 41.025 |
| 366 | 385.4 | 423 | -19.4 | 37.6 |
| 389.4 | 399.75 | 449.55 | -10.35 | 49.8 |
| 392.4 | 399.75 | 449.55 | -7.35 | 49.8 |
| 393.2 | 399.75 | 448.065 | -6.55 | 48.315 |
| 389.4 | 399.75 | 445.95 | -10.35 | 46.2 |
| 386 | 399.75 | 436.05 | -13.75 | 36.3 |

SLOPE = 0.706502

METHOD AND SYSTEM FOR MULTI-ZONE MODELING TO DETERMINE MATERIAL PROPERTIES IN STORAGE TANKS

CROSS-REFERENCE TO RELATED APPLICATIONS

This application claims the benefit of U.S. Patent Application No. 61/347,208 that was filed on May 21, 2010 entitled "Method and System for Multi-Zone Modeling to Determine Material Properties in Storage Tanks." U.S. Patent Application No. 61/347,208 is entirely incorporated by reference herein.

FIELD OF THE DISCLOSURE

The present disclosure relates discover generally to process control systems and, more particularly, to the implementation of multi-zone modeling techniques to determine fluid material properties in batch process tanks without mixers.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, may be, for example, valves, valve positioners, switches and transmitters (e.g., temperature, pressure and flow rate sensors). These field devices may perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations (e.g., workstations). Typically, these application stations are implemented using a personal computer, laptop, or the like that is communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

Process control systems involving batch processes typically process a common set of raw materials or feedstock through various numbers of stages or steps as a batch to produce a product. One or more steps or stages of a batch process may be performed in the same equipment, such as a processing tank, reactor, or other type of processing equipment. The feedstock is fed into the reactor at various stages of the batch process from various other tanks such as storage tanks and other reactors. Process information from field devices and controllers coupled to the storage tanks and reactors may be made available to one or more applications executed by the operator workstation to enable an operator to perforin desired functions with respect to the batch process.

To control the quality of a batch process product, it is important to understand exactly what is happening at each stage of the process. Understanding the properties of the feedstock that is being fed from the storage tanks into the various processing tanks at different stages of the process is one factor to consider in determining the quality of the final product. For example, the feedstock may have varying properties depending on a variety of factors including source, time of year, age, storage conditions, etc. Without a clear understanding of feedstock properties, it may be difficult to control the quality of the final batch process product. For example, any changes in the properties of the feedstock, even within accepted limits, can impact the reactor operation and quality parameters in the final batch process product.

In some processes, feedstock is blended as it is delivered into the storage tank to achieve uniform properties for the feedstock as it is pumped out of the tank and into a reactor. Under turbulent conditions, blending occurs via convection and turbulent dispersion. Dispersion may be created by different equipment: stirred tanks, jet mixers and ultrasound mixers. In processes where the feedstock is blended, continuous calculation of the storage tank pump out concentration may be achieved by also measuring the storage tank's input concentration, input flow, pump out flow and storage tank level (or weight). Processes using blended feedstock also assume perfect blending.

Batch process operations typically do not use blended feedstock. Storage tanks in batch processes are usually loaded periodically from trucks or from reactors and do not employ mixers to mix the feedstock. Deliveries of additional feedstock may be accompanied by analysis data that allows the batch process to at least account for the input feedstock that is added to the previous feedstock. However, as a storage tank is depleted, more feedstock is added. This input feedstock likely includes slightly different properties than the old feedstock. In storage tanks without mixers, a certain amount of stratification or "layering" of the feedstock may occur as new input feedstock is added to the old feedstock. In addition to layering, a certain amount of mixing between the layers may also occur due to naturally-occurring turbulence and other factors, but complete blending is not possible in storage tanks without mixers. As such, it is difficult to predict the exact properties of the pump out feedstock that is fed into a batch process reactor after it leaves the storage tank.

SUMMARY

In a batch process control system employing storage tanks without mixers, properties of the storage tank pump out feedstock may be modeled to more accurately control the quality of a batch process product. This model does not require the measurement of input or pump out flow or assume perfect blending. Rather, the developed model may assume that feedstock input into a storage tank may remain layered with some mixing due to continuous convection, turbulence during loading, or other factors. The model may include a projection of the properties describing a storage tank layer (or zone) of input material into the model. For each new load of storage tank input feedstock, model zones may be shifted and the zone from which the feedstock is drawn into a reactor (i.e., the zone including the pump out feedstock) may be updated with the properties from the new load.

In some embodiments, the model may include a plurality of phases. For example, the phases may include modeling tank loading by applying feedstock properties of an old zone to the new zone, establishing a pump out zone from a storage tank level measurement, calculating storage tank average properties, and calculating outlet properties for the pump out zone and re-calculating average tank properties. These phases may be executed independently or in sequence.

In other embodiments, determining feedstock material properties in a mixer-less storage tank of a process control plant may comprise applying feedstock property values of a previous feedstock zone to a new feedstock zone, establishing a pump out zone based on a storage tank level measurement relative to a tank outlet, and calculating average feedstock property values for a total amount of feedstock within the storage tank. A mixing factor may also be calculated for the pump out zone and pump out feedstock property values for the pump out zone may be based on the average feedstock property values and the mixing factor. The feedstock in the pump out zone may be partially mixed with other feedstock in the storage tank.

In still other embodiments, a method for calculating or determining pump out feedstock material properties in a mixer-less storage tank of a batch process may comprise calculating an average for a feedstock property value for a total amount of feedstock within the storage tank. The total amount of feedstock may include feedstock within a new feedstock zone. The method may further determine a position of the new feedstock zone and a pump out zone within the tank. The position of the new feedstock zone and the pump out zone may correspond to the storage tank inlet and outlet, respectively. The method may also calculate an pump out feedstock property value based on a mixing factor. The mixing factor may include the slope of a best fit regression line for a scattered plot of a lab-derived value of the feedstock property value minus the feedstock property value with no mixing versus the feedstock property value with complete mixing minus the feedstock property value with no mixing.

In still other embodiments, a computer device may determine feedstock material properties in a mixer-less storage tank of a process control plant. The device may include a computer readable memory having a computer implemented application stored thereon including several routines. For example, a first routine may detect a new feedstock delivery to the storage tank and a second routine may updates a data structure with a feedstock property value corresponding to the new feedstock delivery. A third routine may calculate an average for the feedstock property value for a total amount of feedstock within the storage tank where the total amount of feedstock including the new feedstock delivery within a new feedstock zone. A fourth routine may determine a position of the new feedstock zone and a position of a pump out zone within the tank while a fifth routine may calculate an pump out feedstock property value based on a mixing factor of the pump out zone, the mixing factor including the slope of a best fit regression line as described herein.

DETAILED DESCRIPTION

The example methods and apparatus described herein may be used within a process control system to provide in-process fluid material properties enabling an operator to correct a process fault while the process occurs or is on-going. For example, the methods and apparatus described herein may be used with an operations management system (OMS) as described in U.S. patent application Ser. No. 12/538,995 filed on Aug. 11, 2009, the entire disclosure of which is incorporated by reference herein. Process corrections can be implemented in response to storage tank pump out fluid material properties. Further, the example methods and apparatus described herein may be used to correct product quality by determining fluid material properties for the pump out of mixer-less storage tanks and adjusting downstream reactor and other processes of the batch process. A process control system as described herein may include any type of batch processing system, continuous processing system, automation system, and/or manufacturing system.

Figure 1A:
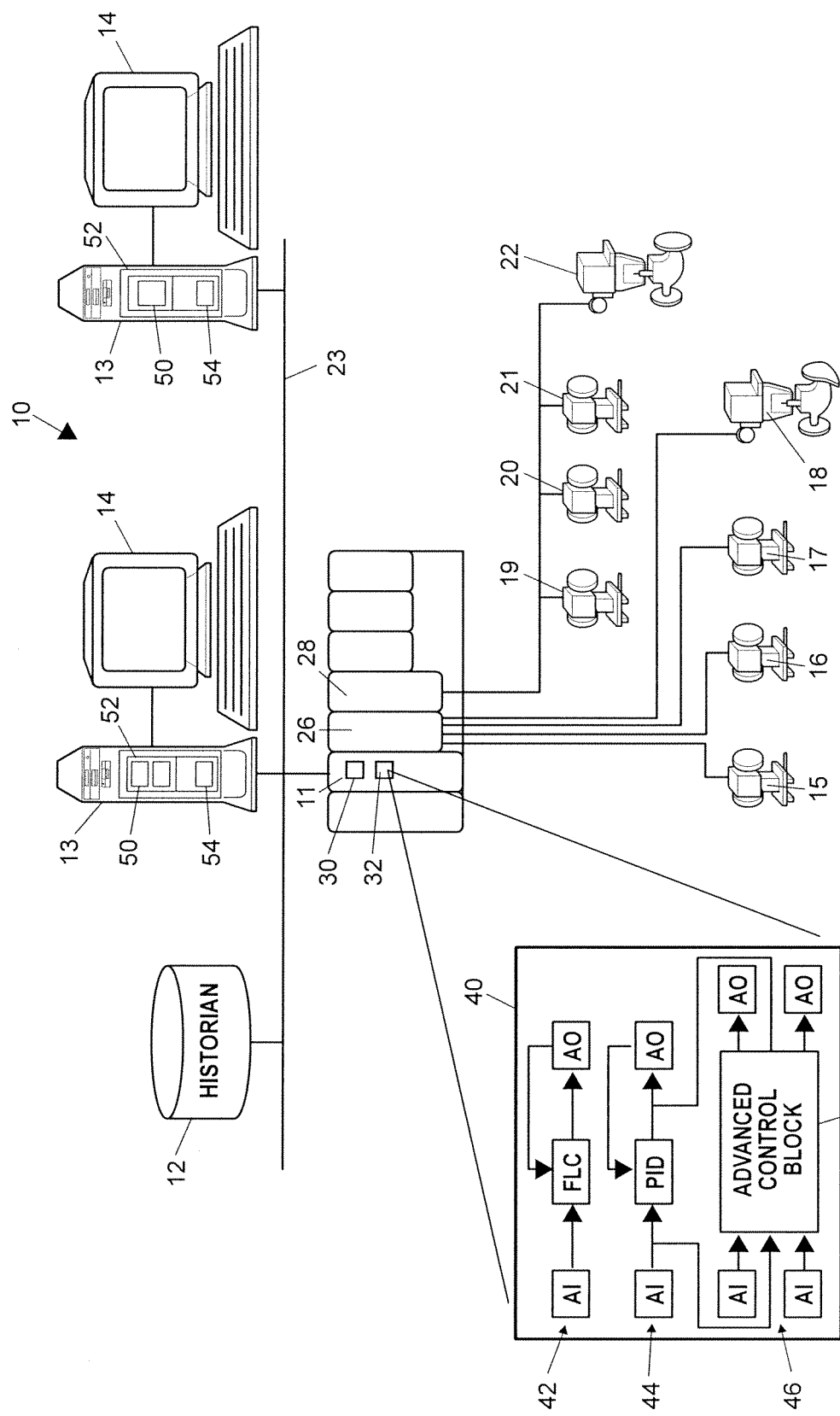
FIG. 1A is a diagram of a process control network having a controller and field devices that may be used to implement processes.

FIG. 1A illustrates an example process control system 10 including a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28 and may operate to implement one or more batch runs of a batch process using the field devices 15-22. The data historian 12 may be any desired type of data collection unit having any desired type of memory and any desired or known software, hardware or firmware for storing data. The data historian 12 may be separate from (as illustrated in FIG. 1A) or a part of one of the workstations 13. The controller 11, which may be, by way of example, the DeltaV® controller sold by Emerson Process Management, is communicatively connected to the host computers 13 and to the data historian 12 via, for example, an Ethernet connection or any other desired communication network 23. The controller 11 is also communicatively connected to the field devices 15-22 using any desired hardware and software associated with, for example, standard 4-20 ma devices and/or any smart communication protocol such as the FOUNDATION® Fieldbus protocol, the HART® protocol, the WirelessHART™ protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1A, the field devices 15-18 are standard 4-20 ma devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. Of course, the field devices 15-22 could conform to any other desired standard(s) or protocols, including any standards or protocols developed in the future.

The controller 11 includes a processor 30 that implements or oversees one or more process control routines (stored in a memory 32), which may include control loops, and communicates with the devices 15-22, the host computers 13 and the data historian 12 to control a process in any desired manner. It should be noted that any control routines or modules described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices.

As illustrated by the exploded block 40 of FIG. 1A, the controller 11 may include a number of single-loop control routines, illustrated as routines 42 and 44, and, if desired, may implement one or more advanced control loops, such as multiple/input-multiple/output control routines, illustrated as control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 46 is illustrated as including inputs communicatively connected to one or more AI function blocks and outputs communicatively connected to one or more AO function blocks, although the inputs and outputs of an advanced control block 48 may be connected to any other desired function blocks or control elements to receive other types of inputs and to provide other types of control outputs. The advanced control block 48 may be any type of model predictive control (MPC) block, neural network modeling or control block, a multi-variable fuzzy logic control block, a real-time-optimizer block, etc. or may be an adaptively tuned control block, etc. It will be understood that the function blocks illustrated in FIG. 1A, including the advanced control block 48, can be executed by the controller 11 or, alternatively, can be located in and executed by any other processing device, such as one of the workstations 13 or even one of the field devices 19-22.

Moreover, as illustrated in FIG. 1A, one or more process analysis routines 50 may be stored and executed by various devices of the process control system 10. While process analysis routines 50 are illustrated as being stored in one or more computer readable memories 52 to be executed on processors 54 of the workstations 13, the routines 50 could be stored in and executed in other devices instead. Each process analysis routine 50 is communicatively coupled to one or more control routines such as the control routines 42, 44, 46, and/or to the data historian 12 to receive one or more measured process variable measurements. Each process analysis routine 50 may be used to develop a statistical process model and to analyze an on-going or on-line batch process based on that model. The analysis routines 50 may also display information to users, such as batch operators, regarding the on-line or on-going batch, as being implemented by the process control system 10. In some embodiments, a process analysis routine 50 may include a routine to determine the material properties of feedstock output from a mixer-less storage tank, as herein described.

Figure 1B:
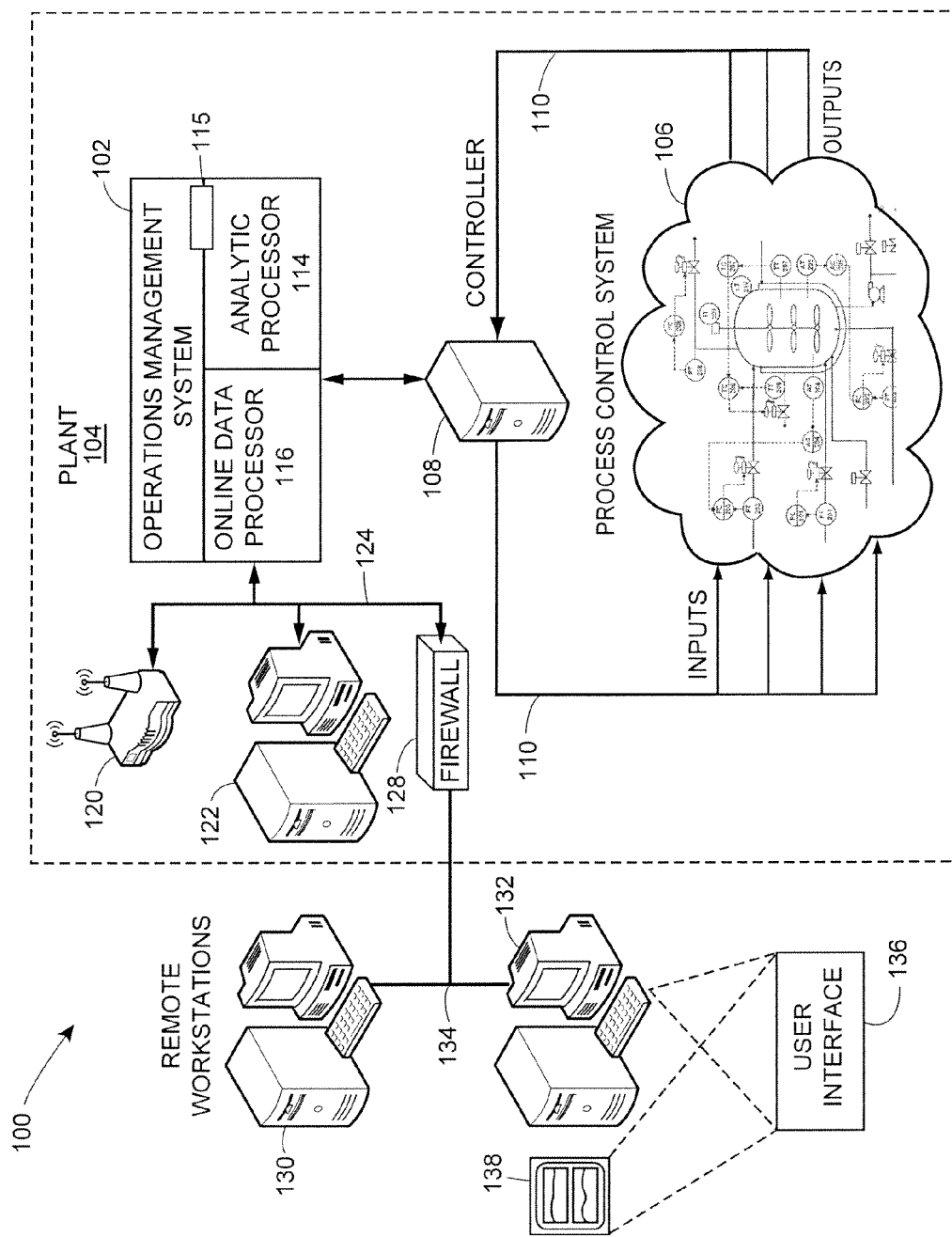
FIG. 1B illustrates an example block diagram for a process control system including an example operations management system and multi-zone modeling module.

FIG. 1B is a block diagram illustrating a further example of a process control environment 100 including an operations management system (OMS) 102 which is also referred to as a Process Monitoring and Quality Prediction System (PMS). The OMS 102 is located within a plant 104 that includes a process control system 106. The example plant 104 may be any type of manufacturing facility, process facility, automation facility, and/or any other type of process control structure or system. In some examples, the plant 104 may include multiple facilities located at different locations, and although the plant 104 of FIG. 1B is illustrated as including the process control system 106, the plant 104 may include additional process control systems.

The process control system 106, which is communicatively coupled to a controller 108 via a data bus 110 may include any number of field devices (e.g., input and/or output devices) for implementing process functions such as performing physical functions within the process or taking measurements of process variables. The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure process variables within or portions of a process. The input devices may receive instructions from the controller 108 to execute one or more specified commands and cause a change to the process. Furthermore, the output devices measure process data, environmental data, and/or input device data and transmit the measured data to the controller 108 as process control information. This process control information may include the values of variables (e.g., measured process variables and/or measured quality variables) corresponding to a measured output from each field device.

In the illustrated example of FIG. 1B, the controller 108 may communicate with the field devices within the process control system 106 via the data bus 110, which may be coupled to intermediate communication components within the process control system 106. These communication components may include field junction boxes to communicatively couple field devices in a command area to the data bus 110. Additionally, the communication components may include marshalling cabinets to organize the communication paths to the field devices and/or field junction boxes. Furthermore, the communication components may include I/O cards to receive data from the field devices and convert the data into a communication medium capable of being received by the example controller 108. These I/O cards may convert data from the controller 108 into a data format capable of being processed by the corresponding field devices. In one example, the data bus 110 may be implemented using the Fieldbus protocol or other types of wired and/or wireless communication protocols (e.g., Profibus protocol, HART protocol, etc.).

The controller 108 of FIG. 1B manages one or more control routines to manage the field devices within the process control system 106. The control routines may include process monitoring applications, alarm management applications, process trending and/or history applications, batch processing and/or campaign management applications, statistical applications, streaming video applications, advanced control applications, etc. Furthermore, the controller 108 may forward process control information to the OMS 102. The control routines may be implemented to ensure that the process control system 106 produces specified quantities of a desired product within a certain quality threshold. For example, the process control system 106 may be configured as a batch system that produces a product at a conclusion of a batch. In other examples, the process control system 106 may include a continuous process manufacturing system that constantly produces products.

The process control information from the controller 108 may include values corresponding to measured process and/or quality variables that originate in the field devices within the process control system 106. In other examples, the OMS 102 may parse values within the process control information into the corresponding variables. The measured process variables may be associated with process control information originating from field devices that measure portions of the process and/or characteristics of the field devices. The measured quality variables may be associated with process control information related to measuring characteristics of the process that are associated with at least a portion of a completed product.

For example, the process plant may perform a chemical reaction in a tank or reactor that produces a concentration of a chemical in a fluid. In this example, the concentration of the chemical in the fluid may be a quality variable. A temperature of the fluid and a rate of fluid flow into the tank may be process variables. The OMS 102, via process control modeling and/or monitoring, may determine that the concentration of the fluid in the tank is based on the temperature of the fluid in the tank and the fluid (e.g., feedstock) flow rate into the reactor. Thus, not only is the concentration a quality variable, but the fluid flow rate and the fluid temperature contribute to or affect the quality of the concentration. In other words, the measured process variables contribute to or affect the quality of the measured quality variable. The OMS 102 may use statistical processing to determine the amount of influence and/or contribution each process variable has on a quality variable.

Additionally, the OMS 102 may model and/or determine relationships between the measured process variables and/or quality variables associated with the process control system 106. These relationships between the measured process and/or quality variables may produce one or more calculated quality variables. A calculated quality variable may be a multivariate and/or linear algebraic combination of one or more measured process variables, measured quality variables, and/or other calculated quality variables. Furthermore, the OMS 102 may determine an overall quality variable from a combination of the measured process variables, measured quality variables, and/or calculated quality variables. The overall quality variable may correspond to a quality determination of the entire process and/or may correspond to a predicted quality of a resulting product of the process.

The OMS 102 of FIG. 1B includes an analytic processor 114 which utilizes descriptive modeling, predictive modeling, and/or optimization to generate feedback regarding the status and/or quality of the process control system 106. The analytic analyzer 114 may be communicatively coupled to one or more modeling modules 115 that model various properties of the process performed by the plant 104. The analytic processor 114 may detect, identify, and/or diagnose process operation faults and predict the impact of any faults on quality variables and/or an overall quality variable associated with a quality of a resultant product of the process control system 106. Furthermore, the analytic processor 114 may monitor the quality of the process by statistically and/or logically combining quality and/or process variables into an overall quality variable associated with the overall quality of the process. The analytic processor 114 may then compare the values calculated for the overall quality variable and/or values associated with the other quality variables to respective thresholds. These thresholds may be based on the predetermined quality limits of the overall quality variable at different times within the process. For example, if an overall quality variable associated with a process exceeds a threshold for an amount of time, the predicted final quality of the resulting product may not meet quality metrics associated with the finished product. One example of a modeling module 115 includes a feedstock properties modeling module 115 that models material properties in mixer-less storage tanks, as described herein.

If the overall quality variable and/or any other quality variables deviate from the respective thresholds, the analytic processor 114 may generate a fault indication within a process overview chart and/or a process variation graph that shows an explained and/or an unexplained variation (or variance) associated with the overall quality variable and/or may show a variable that generated the process fault. The example analytic processor 114 manages the analysis to determine a cause of one or more process faults by providing functionality that enables an operator to generate process quality graphs (e.g., combination graphs, microcharts, process variation graphs, variable trend graphs, graphics, etc.) that may display current and/or past values of measured process variables, measured quality variables, and/or calculated quality variables. Furthermore, the analytic processor 114 generates these graphs while the process is operating and continually updates and/or re-calculates multivariate statistics associated with each of the graphs as additional process control information is received by the OMS 102.

The analytic processor 114 may generate a contribution graph by calculating contributions of process variables and/or quality variables to the overall quality variable or the quality variable triggering the fault. The contributions of the process and/or quality variables may be displayed as an explained and/or an unexplained variation of each variable as a contribution to the variation associated with the overall quality and/or the quality variable associated with the fault.

Furthermore, the example analytic processor 114 may generate variable trend graphs for any of the selected process and/or quality variables that may have variations greater than a defined threshold. The variable trend graph may show values associated with the variable over a time of the process in relation to values of the variable during similar times in previous processes. By generating the contribution graph and/or the variable trend graphs, the analytic process 114 may also identify possible corrections to the process to mediate the detected fault. The variable trend graph may assist an operator to determine a cause of a process fault by providing an overlay of historical plots with associated variations (e.g., standard deviations) with the current value.

The analytic processor 114 may generate a quality prediction graph to determine the effect of the correction(s), if implemented, on the overall quality of the process. If the correction(s) maintain or improve the overall quality to within specified thresholds, the analytic processor 114 may indicate to the OMS 102 to implement the correction(s). Alternatively, the analytic processor 114 may send instructions to the controller 108 to implement the process correction(s).

Further, the example analytic processor 114 may generate a microchart upon determining a fault associated with an overall quality variable and/or any other quality variable. The microchart may include values of the process and/or quality variables at a specified time (e.g., a time associated with the process fault) in relation to a mean value and/or a standard deviation for each of the variables. Additionally, the microchart may include spark lines that indicate prior values associated with each of the process and/or quality variables. From the microchart, the example analytic processor 114 may enable an operator to determine and/or select one or more corrective actions to the process and/or determine if any of the corrections will improve the process such that the overall quality variable is predicted to be within the specified limits.

The example OMS 102 manages access and control to the process control data including the process variation graphs, contribution graphs, variable trend graphs, quality prediction graphs, and/or microcharts via an online data processor 116. Additionally, the online data processor 116 provides access to process control operators to view process control data, change and/or modify process control data, and/or generate instructions for field devices within the process control system 106.

The plant 104 of FIG. 1B includes a router 120 and a local workstation 122 communicatively coupled to the online data processor 116 via a local area network 124 (LAN). Further, the example router 120 may communicatively couple any other workstations (not shown) within the plant 104 to the LAN 124 and/or the online data processor 116. The router 120 may communicatively couple to the other workstations wirelessly and/or via a wired connection. The router 120 may include any type of wireless and/or wired router as an access hub to the LAN 124 and/or the online data processor 116.

The LAN 124 may be implemented using any desired communication medium and protocol. For example, the LAN 124 may be based on a hardwired or wireless Ethernet communication scheme. However, any other suitable communication medium and protocol could be used. Furthermore, although a single LAN is shown, more than one LAN and appropriate communication hardware within the workstation 122 may be used to provide redundant communication paths between the workstation 122 and a respective similar workstation (not shown).

The LAN 124 is also communicatively coupled to a firewall 128. The firewall 128 determines, based on one or more rules, whether communication from remote workstations 130 and/or 132 is to be permitted into the plant 104. The example remote workstations 130 and 132 may provide operators that are not within the plant 104 access to resources within the plant 104. The remote workstations 130 and 132 are communicatively coupled to the firewall 128 via a Wide Area Network (WAN) 134.

The example workstations 122, 130 and/or 132 may be configured to view, modify, and/or correct one or more processes within the process control system 106. For example the workstations 122, 130 and/or 132 may include a user interface 136 that formats and/or displays process control information generated by the OMS 102. For example, the user interface 136 may receive generated graphs and/or charts or, alternatively, data for generating a process control graph and/or chart from the OMS 102. Upon receiving the graph and/or chart data in the respective workstation 122, 130, and/or 132, the user interface 136 may generate a display of a graph and/or a chart 138 that is relatively easy for an operator to understand. The example in FIG. 1B shows the workstation 132 with the user interface 136. However, the workstations 122 and/or 130 may include user interfaces 136.

The example user interface 136 may alert a process control operator to the occurrence of any process control faults within the process control system 106 and/or any other process control systems within the plant 104. Furthermore, the user interface 136 may guide a process control operator through an analysis process to determine a source of a process fault and to predict an impact of the process fault on the quality of the resultant product. The user interface 136 may provide an operator process control statistical information as the process is occurring, thereby enabling the operator to make any adjustments to the process to correct for any faults. By correcting for faults during the process, the operator may maintain a quality of the resulting product.

The example user interface 136, via the example OMS 102, may display the detection, analysis, corrective action, and quality prediction information. For example, the user interface 136 may display a process overview chart, a process variation graph, a microchart, a contribution graph, a variable trend graph, and/or a quality prediction graph (e.g., the graph 138). Upon viewing these graphs 138, the operator may select additional graphs 138 to view multivariate and/or statistical process information to determine a cause of a process fault. Additionally, the user interface 136 may display possible corrective actions to a process fault. The user interface 136 may then allow an operator to select one or more corrective actions. Upon a selection of a correction, the user interface 136 may transmit the correction to the OMS 102, which then sends an instruction to the controller 108 to make the appropriate correction in the process control system 106.

The example workstations 122, 130 and/or 132 of FIG. 1A may include any computing device including a personal computer, a laptop, a server, a controller, a personal digital assistant (PDA), a micro computer, etc. The workstations 122, 130 and/or 132 may be implemented using any suitable computer system or processing system (e.g., the processor system P10 of FIG. 10). For example, the workstations 122, 130 and/or 132 could be implemented using a single processor, personal computer, single or multi-processor workstations, etc.

The example process control environment 100 is provided to illustrate one type of system within which the methods and apparatus described in greater detail below may be advantageously employed. However, the methods and apparatus described herein may, if desired, be advantageously employed in other systems of greater or less complexity than the example process control environment 100 and/or the process control system 106 shown in FIG. 1A and/or systems that are used in connection with process control activities, enterprise management activities, communication activities, etc.

Figure 2:
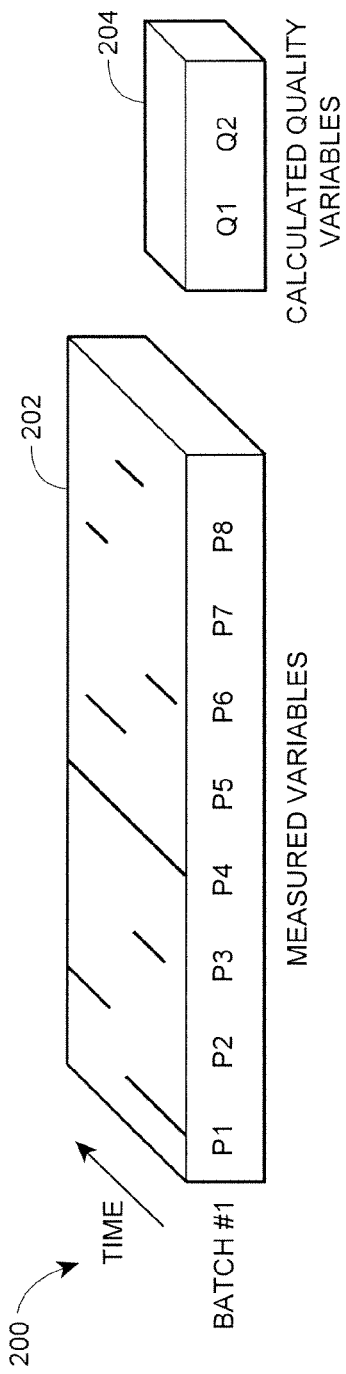
FIG. 2 illustrates a data structure for an example batch including process variables and quality variables.

FIG. 2 represents a data structure 200 for an example batch (e.g., Batch #1) including measured variables 202 and calculated quality variables 204. The example data structure 200 may also include an overall quality variable (not shown) which may be obtained at the end of the batch via measurements or observations. Batch processing is a type of product manufacturing where a relatively large number of products and/or portions of products are created in parallel at one or more locations controlled by a routine. The routine may include one or more process stages, with each stage including one or more operations and each operation including one or more phases. While the methods and apparatus described herein refer to batch processes, any type of process may be implemented.

The example measured variables 202 include measured process and/or quality variables. For example, the variable P1 may correspond to a fluid flow rate (e.g., a process variable) and the variable P2 may correspond to a concentration of a fluid (e.g., a quality variable). The measured variables 202 are shown in connection with the batch process BATCH #1. The batch process occurs during a time period shown along the t-axis (e.g., TIME). Additionally, the batch process of FIG. 2 includes eight measured variables. However, in other examples, the batch process may include fewer or more measured variables.

FIG. 2 also illustrates that some of the measured variables 202 are relevant for only certain times during the batch process. For example, the variable P1 is relevant from the start of the batch to a midway point through the batch. Thus, if the variable P1 is associated with a fluid flow rate, fluid may only be flowing during the batch process from the beginning of the batch to a midpoint of the batch. After this point, the batch may not utilize a fluid flow and thus, the variable P1 is not relevant to the batch process past this point. In contrast, the variable P4 is relevant for the entire batch process.

The example calculated quality variables 204 are associated with the entire batch process or maybe associated with a particular phase or stage of the batch process. The calculated quality variables 204 may be the result of a multivariate, statistical, and/or algebraic relationship between the measured variables 202 and/or other quality variables 204. For example, the quality variable Q1 204 may correspond to a composition quality of a resulting product from the batch process. The composition quality Q1 may be a quality variable because it may not be directly measurable within the process control system 106. Instead, the composition quality Q1 may be modeled and/or determined from a multivariate combination of the measured variables 202 P1, P3, P4 and P7.

Thus, if the composition quality Q1 exceeds a defined threshold, any one and/or combination of the measured variables P1, P3, P4 and/or P7 may be a contributing factor to the deviation.

Figure 3:
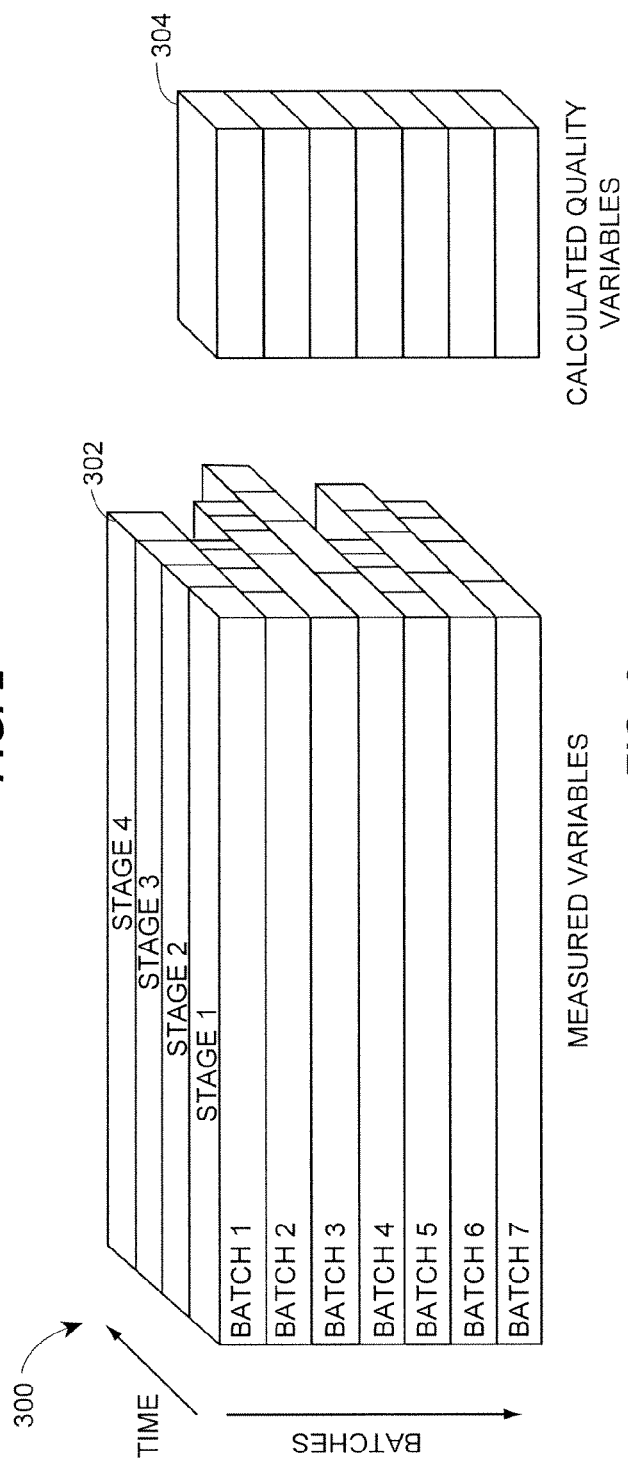
FIG. 3 illustrates a data structure for example batches including process variables and respective quality variables.

FIG. 3 represents a data structure 300 for a set of example batches including process variables 302 and respective quality variables 304. The batches (e.g., BATCHES 1-7) show that a batch process includes stages (e.g., STAGES 1-4) that are executed in a serial order. For example, STAGE 1 may correspond to a combination and mixing of chemicals or other feedstock in a batch while STAGE 2 corresponds to a baking of those mixed chemicals in the batch. These stages may further be subdivided into operations, phases, and/or levels. Additionally, the calculated quality variables 306 correspond to the measured variables 302 at each batch.

Figures 4, 5:
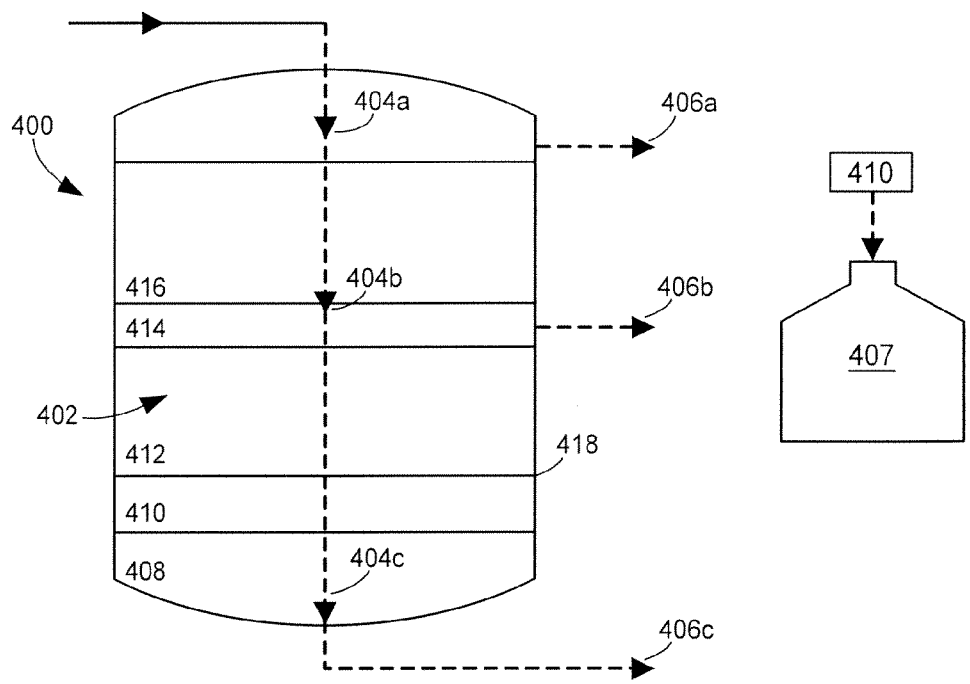
FIG. 4 illustrates a storage tank for use with multi-zone modeling to determine material properties in storage tanks.
FIG. 5 illustrates a data structure for organizing storage tank material property data.

FIG. 4 represents an example of a storage tank 400 that may be used in one of the stages of a batch process described above in FIG. 3 (e.g., STAGE 1). As briefly described above, determining the feedstock pump out properties for feedstock 402 within tanks 400 may assist fault detection and the quality of the batch process product. In some embodiments, functions, instructions, methods, etc., for determining the feedstock pump out properties may be carried out by a feedstock properties modeling module 115 (FIG. 1B) of the OMS.

The calculations to determine the feedstock properties described herein may be performed while the process is online to supplement process monitoring, fault detection, quality prediction, and process control, to name only a few potential online uses. The calculations to determine the feedstock properties described herein may also be performed by offline process modeling to supplement or validate online modeling, developing fault detection models in principal components analysis (PCA), partial least squares (PLS) analysis, etc.

Mixer-less storage tanks 400 include both an inlet 404 where the feedstock 402 is delivered to the tank 400 and an outlet 406 where the feedstock 402 is delivered out of the tank 400 into another component of the plant (e.g., a reactor 407 or other component). As illustrated in FIG. 4, the tank 400 may include different configurations of the inlet 404 and the outlet 406. For example, the tank 400 may include any combination of a top inlet 404a, a middle inlet 404b, or a bottom inlet 404c and a top outlet 406a, a middle outlet 406b, or a bottom outlet 406c. Of course, the inlets 404 and outlets 406 depicted in FIG. 4 are for illustration of general areas the inlets 404 and outlets 406 may be positioned on the tank 400. While the inlets 404 and outlets 406 may be positioned at any point in the tank 400 to accomplish delivery of the feedstock 402 to and from the tank, the methods described herein may include a default position of a bottom outlet 406c.

Where the feedstock 402 is delivered to and from the tank 402 may determine a type of flow resulting in a degree of mixing of various deliveries of feedstock 400 within the tank 402. For example, where the tank 402 includes a bottom inlet 404c and a top outlet 406a, a high degree of mixing may be assumed and the flow type may be described as "completely mixed." However, where the tank 402 includes a top inlet 404a and a bottom outlet 406c, a low degree of mixing may be assumed and the flow type may be described as "plug flow." Plug flow may describe an outlet condition where feedstock is drawn from the bottom of the storage tank 400 one zone at a time and with minimal mixing. Where the inlet 404 and outlet 406 are positioned at the same point within the tank 400 (with some variations due to the amount of feedstock 402 within the tank 400 at the time of feedstock delivery), the flow type may be described as "short circuiting."

Where the flow type is not completely mixed, a degree of stratification or layering of the feedstock 402 may occur upon delivery of new feedstock into the tank 400. Feedstock delivery to the tank 400 over discrete time periods may create layers or "zones" of the various deliveries with some degree of feedstock mixing between the zones. With reference to FIG. 4, the feedstock deliveries may result in zones ranging from the oldest delivery 408 to the most recent delivery 416. Thus, where the tank 400 currently holds five discrete deliveries of feedstock 402, the tank 400 includes five zones of feedstock 402 indicated in FIG. 4 by layers 408, 410, 412, 414, and 416. The feedstock layers 408-416 may become slightly mixed due to chemical, physical, and other reactions resulting from various concentrations and other differences between the different deliveries. Mixing may also occur due to movement of the feedstock within the storage tank 400 from, for example, tank movement, inlet and outlet movement, flow, etc.

Each delivery of feedstock 402 into the tank 400 may include a plurality of material properties. FIG. 5 illustrates a representation of a data structure 500 that may be communicatively coupled to the feedstock properties modeling module 115 and used to store properties 502 of the feedstock 402 currently held within a storage tank 400. The properties 502 may include values 504 for physical, chemical, and other feedstock characteristics including pH balance, reactivity, toxicity, concentration, density, molecular weight, and viscosity to name only a few. Properties for each delivery of feedstock 402 may be included in data received from the feedstock vendor, may be determined through analysis by the receiver, or may be passed to the OMS 102 by any other suitable method. An amount property 506 includes a value representing the volume, weight, or quantity of the delivered feedstock. The amount property 506 may be used in combination with physical properties of the tank (e.g., the tank capacity, internal dimensions, storage volume limit, etc.) to determine other measurements such as an approximate position of each feedstock zone within the tank, an approximate position of a mixing region between each zone, etc. A time property 508 indicates when the feedstock was delivered to the tank. The time property may also be used to determine other characteristics of the feedstock. For example, the properties 502 of some types of feedstock may change over time in a known manner. As a particular zone of feedstock ages, the property values 504 of the aging zones may be altered to reflect any known changes. Likewise, mixing may increase over time due to various chemical and physical properties of the feedstock at each zone. As such, a mixing factor as described herein may change to reflect changes due to aging, mixing, and other factors.

In some embodiments, the data structure 500 may be implemented as a stack data structure that reflects the position of the feedstock zones within the storage tank and relative to the inlet 404 and outlet 406. For example, where the outlet is in the default bottom position 406c (FIG. 4) and the inlet is in the top position 404a, the data structure may be implemented as a "first in, first out" (FIFO) stack where the oldest feedstock delivery is the first to be pumped out of the tank and the newest feedstock delivery is the last to be pumped out of the tank. Likewise, where the outlet is in the default bottom position 406c and the inlet is also in the bottom position 404c, the data structure may be implemented as a "first in, last out" (FILO) stack describing a configuration where the oldest feedstock delivery is the last to be pumped out of the tank and the newest feedstock delivery is the first to be pumped out of the tank. Where the outlet is in the default bottom position 406c and the inlet is in the middle position 404b, the a mixture of both FIFO and FILO stack methods may be used. The stack 500 may be implemented as an array, linked list, or other type of known data structure.

In operation, the stack 500 may be updated to reflect the physical status of the feedstock 402 within the tank 400. For example, as new feedstock 402 is delivered to the tank 400, a set of properties 502 is "pushed" into the stack 500 using one or more programming instructions. If a zone is completely depleted from the tank, other programming instructions may "pop" the depleted properties from the stack. Other instructions may implement a pointer 510 indicating which zone is active or currently being pumped out of the tank 400 (i.e., a pump out zone). For example, in a plug-flow configured tank 400, the pump out zone may be zone 408 until zone 408 is depleted, then zone 410 would become active. In this example, the pointer 510 would indicate the properties of "zone 1" were active until zone 1 was depleted. Once depleted, the properties of zone 1 may be popped from the stack and the properties of previous zone 2 would assume the position at the top of the stack (i.e., zone 1). Where the stack 500 is implemented as a FIFO stack, the pointer 510 may point to the set of properties at the top of the stack 500 (e.g., a "top" or "peek" instruction). In operation, as one zone is depleted from the tank 400, the pointer 510 may be switched to the next zone to be pumped out. Where the inlet 404 and outlet 406 position within the tank 400 dictate implementation of a FIFO stack 500, the pointer 510 may correspond to the oldest zone, as indicated by the time property 508, until the amount 506 is depleted from the tank 400, then the pointer 510 is switched to the next oldest zone, and so on.

Figure 6A:
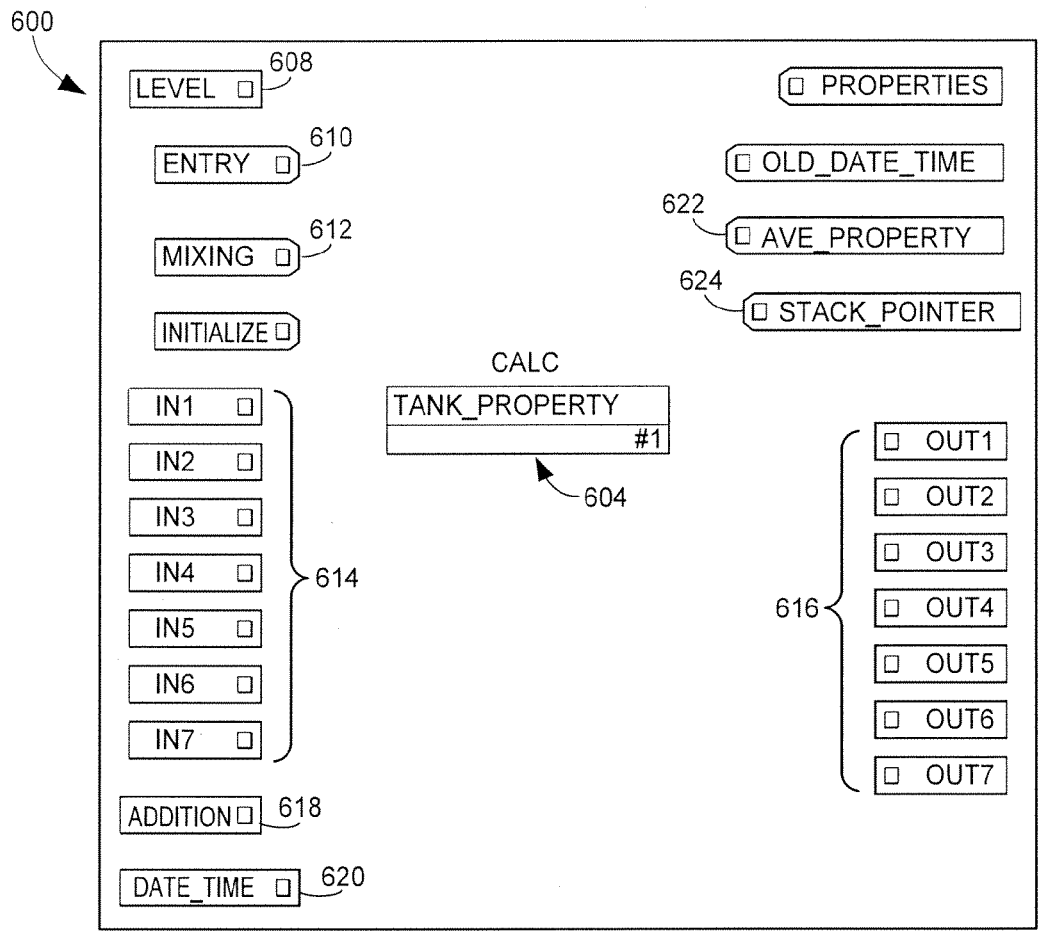
FIG. 6A illustrates a composite function block for use with multi-zone modeling to determine material properties in storage tanks.
Figure 6B:
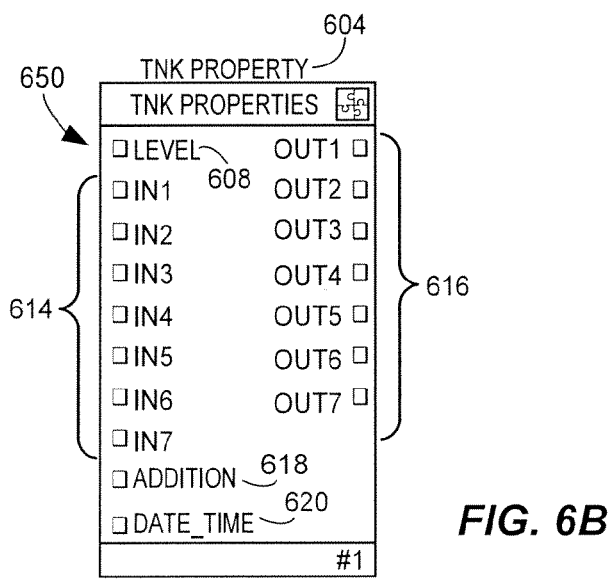
FIG. 6B illustrates a function block view of the composite function block illustrated by FIG. 6A.

The feedstock properties modeling module 115 may be configured as a composite function block for use with the OMS 102 to determine properties of the feedstock 402 that is being drawn from the mixer-less storage tank 400 to a reactor 407 or other process plant entity. FIG. 6A illustrates one example of a composite function block 600 to determine feedstock properties. FIG. 6B illustrates one example of a function block view 650 of the composite function block 600. The function block view 650 may be represented in a user interface application to graphically represent any aspect of the process control system 100 and to modify or control the function block 600 or any other aspect of the control system 100. In some embodiments, the user interface is the DeltaV® Control Studio® application. Returning to FIG. 6A, the composite function block 600 may include one or more function blocks such as calculation block 604, and other function blocks. The composite function block 600 may define a tank property calculation block 604 and include a plurality parameters defining feedstock properties 502 as well as other the properties including variations in storage tank 400 design. As such, the composite function block 600 may be communicatively coupled to the stack data structure 500. Further, the composite function block may be configured to update the stack 500 automatically or via a user interface.

In some embodiments, the parameters include external parameters describing the total number of zones or levels 608 of feedstock that are currently in the storage tank 400 (e.g., a total volume of feedstock in the tank), a point of feedstock inlet 610 (e.g., top, middle, bottom) into the storage tank 400, and a mixing factor 612 that describes the degree the zones are mixed together within the storage tank 400. The mixing factor 612 may include a value from zero to one where zero means no mixing or and one means completely mixed. Generally, where the tank 400 is configured for feedstock outlet at the bottom and inlet at the middle or top inlet position 404a, then the mixing factor for a plug flow tank may be greater than zero. Further, where the tank 400 is configured for feedstock outlet at the bottom and inlet at the bottom inlet position 404c, then the mixing factor for a plug flow tank may be close to zero. A mixing factor 612 may be used to describe the mixing condition of one or more properties of the feedstock for the entire tank 400, for each zone or layer within a tank, or for combination of zones.

The data parameters may also include a plurality of external input parameters describing input properties 614 of the feedstock 402 at a particular level within the tank 400 as well as external outlet properties 616 describing the properties of the feedstock zone that is at the level of the outlet 406 (i.e., the pump out zone). The feedstock input properties 614 and outlet properties 616 may include a plurality of values indicating chemical, physical, and other characteristics of the feedstock (e.g., pH balance, reactivity, toxicity, concentration, density, molecular weight, etc.). The input properties 614 may include values as measured or assumed at the time the feedstock was input into the storage tank 400, while the outlet properties 616 may include values as calculated by the tank property calculation block 604 for the feedstock zone that is being drawn out of the storage tank 400. The composite function block 600 may access the input properties 614 from the stack 500 as described above with reference to FIG. 5. While FIG. 6A shows seven input and outlet properties 616, there may be a fewer or greater number of properties. Other blocks may include an addition block 618 indicating an amount of feedstock that was added to the storage tank (e.g., a weight, volume, or other measure of the amount of feedstock added at a particular zone within the storage tank) and a date/time block 620 including a value describing the date and time a particular feedstock zone was added to the storage tank 400.

Function blocks may include output parameter 622 to indicate an average value for each property being tracked for the total feedstock within the tank and a stack pointer output 624 to indicate which zone of the feedstock is currently being drawn out of the tank 400 and the current position of the pointer 510. The tank property calculation block 604 may include one or more instructions or equations that are executed by a processor for determining outlet properties 616 based on the input properties 614 and other data described above. In some embodiments, when a new delivery of feedstock 402 is input into a storage tank, the stack 500 is updated and the new feedstock properties are "pushed" into the stack 500. For example, updating the stack may include adding a new set of properties to the stack 500, increasing the level block 608 to account for the addition of an amount of feedstock 506 and a new zone 512, setting the addition on external input parameter 618 to reflect the amount of feedstock 506 included in the new delivery, and setting the date/time on the external input parameter 620 to reflect a time 508 for the new addition. The tank properties averages may be developed by the calculation block 604 and new average values are applied to the output parameter 622 to account for the addition of new feedstock. The tank property calculation block 604 may then determine the outlet properties 616 of the feedstock drawn from the tank 400 based on the new average value, the feedstock properties corresponding to the feedstock level from which the feedstock is drawn, and the degree of mixing 612. The calculated outlet properties may then be saved to the composite function block 600.

The tank property calculation block 604 may include several instructions for determining the outlet properties 616, as described by the following equations. In general, the value of the each feedstock pump out property at the outlet 406C is assumed to be equal to the value of the particular property as it was delivered to the tank 400 (i.e., the pump out property). The pump out property may be adjusted by the calculation block 604 to account for mixing that may occur between the various feedstock zones caused by feedstock deliveries. Where a mixing factor m, a pump out property P, and an average value for the property within the tank A is known, the value of an outlet property Q may be described as:

$$Q=(1-m)P+mA \qquad \text{(Equation 1)}$$

where m is the mixing factor defined in the block 612 that describes the degree to which one or more properties are mixed throughout the entire tank, P is the value of the unmixed property as it was delivered to the tank 400, and A is the average value for the property within the tank 400 as recorded at the time the feedstock was delivered to the tank. For example, a tank 400 configured for plug flow includes three zones of a fluid: the first (bottom) zone including a pH of 4.2, the second (middle) zone including a pH of 4.6, and the third (top) zone including a pH of 4.1. The plug flow tank is configured to draw the feedstock from the first zone and the mixing factor for the tank is 0.2. With an average tank pH of 4.3, the outlet property value of pH would equal (1-0.2)(4.2)+(0.2)(4.3) or 4.22.

Given Equation 1, it is possible to determine a mixing factor m if the value for Q is determined through lab measurements (i.e., $Q_{lab}$) and the value of the pump out property P and the average value for the property within the tank A are also known. While optimal values for the mixing factor 612 (m) may be derived directly from Equation 1, the mixing factor 612 may also be determined as a least squares solution defined by a slope of the best fit regression line described by:

$$Q-P=(A-P)m \qquad \text{(Equation 2)}$$

Determining the mixing factor 612 (m) by a regression line slope may be described as a "least squares" solution as the slope of a best fit regression line for the scattered plot of:

$$(Q-P) \text{ vs. } (A-P) \qquad \text{(Equation 3)}$$

Determining the mixing factor by a regression line slope may be beneficial as not being dependent on a constant bias as shown in the general regression line equation:

$$m = \frac{\Sigma(x-\bar{x})(y-\bar{y})}{\Sigma(x-\bar{x})^2} \qquad \text{(Equation 4)}$$

where y and $\bar{y}$ as well as x and $\bar{x}$ contain about the same amount of bias, so bias in y-$\bar{y}$ and x-$\bar{x}$ is generally eliminated. For the slope calculation described by Equation 4, y=(Q-P) and x=(A-P).

In another embodiment, calculating the outlet properties 616 begins with defining a weighted average $\bar{P}_i$ for every property $P_i$, assuming perfect mixing:

$$\bar{P}_i = \sum_{k=1}^{n} \frac{P_i^k w^k}{W} \qquad \text{(Equation 5)}$$

where $P_i^k$ is the value of the property $P_i$ for the zone k; $w^k$ is the material quantity (weight) in the zone k; W is the total material weight in the tank with n loaded zones where:

$$W = \sum_{k=1}^{n} w^k \qquad \text{(Equation 6)}$$

The tank outlet property $p_i^{outlet}$ may be defined as:

$$p_i^{outlet}=(1-m)p_i^k+m\overline{P}_i \qquad \text{(Equation 7)}$$

where k=1 for the bottom load and k=n for the top load, 1≤k≤n, and m is a mixing factor where 0≤m≤1. When m=1, there is perfect mixing, $p_i^{outlet}=\overline{P}_i$ and for m=0 there is no mixing, and $p_i^{outlet}=p_i^k$, i.e., outlet material properties are the same as the original properties in the current pump out zone. Implementations when tank loads differ insignificantly may be described by Equation 8:

$$\overline{P}_i = \sum_{k=1}^{n} \frac{P_i^k}{n} \qquad \text{(Equation 8)}$$

Figures 7A, 7B:
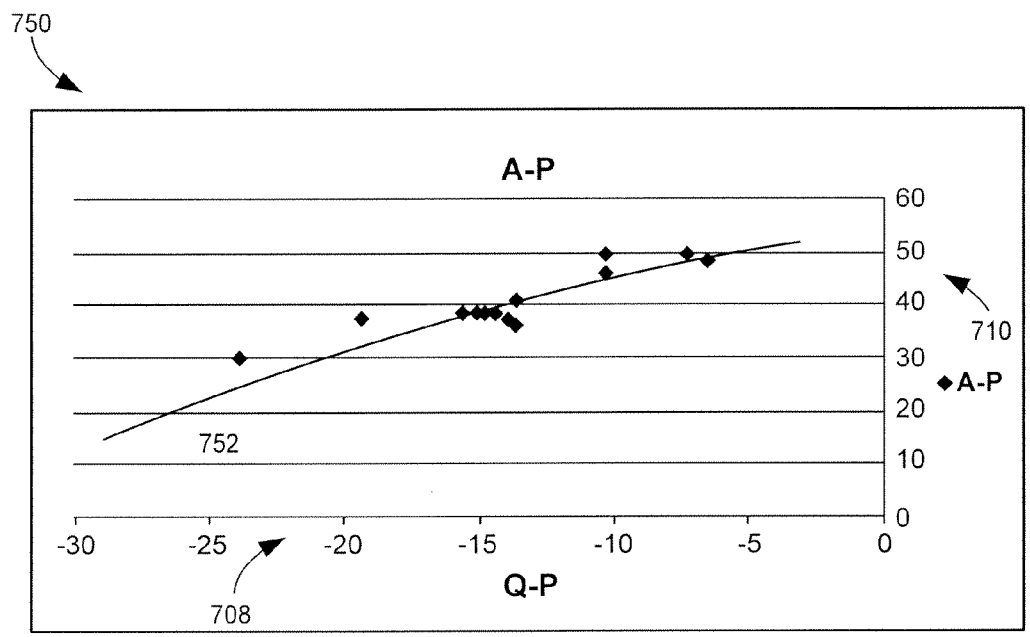
FIG. 7A illustrates data used to calculate a mixing factor.
FIG. 7B illustrates a scatter plot of the data in FIG. 7A.

FIG. 7A illustrates one example of data 700 used for a scattered plot graph 750 (FIG. 7B). The data 700 used for the graph 750 may include a lab-derived feedstock property value $Q_{lab}$ 702, the value of the pump out property P 704, the average value for the property within the tank A 706, the value of (Q–P) 708 and the value of (A–P) 710. FIG. 7B illustrates a scattered plot graph 750 that includes a plot of the values of (Q–P) 708 versus (A–P) 710, and a best fit regression line 752. Using Equation 4, the model 115 in general and the tank property calculation block 604 of the composite function block 600 in particular may include one or more instructions to calculate the slope 712 (FIG. 7A) of the best fit regression line 752, i.e., the mixing factor m.

One implementation of the tank property calculation block 604 includes the following instructions:

```
1 | IF ('^/DATE_TIME.CV' != '^/OLD_DATE_TIME.CV') THEN
2 |     '^/OLD_DATE_TIME.CV' := '^/DATE_TIME.CV';
3 |     I := 1;
4 |     WHILE (I <=19) DO
5 |         K := 20-I;
6 |         L := K+1;
7 |         J := 1;
8 |         WHILE (J <= 8) DO
9 |             '^/PROPERTIES'[L][J] := '^/PROPERTIES' [K][J];
10|             J := J+1;
11|         END_WHILE;
12|         I := I+1;
13|     END_WHILE;
14|     '^/PROPERTIES'[1][1] := '^/IN1.CV';
15|     '^/PROPERTIES'[1][2] := '^/IN2.CV';
16|     '^/PROPERTIES'[1][3] := '^/IN3.CV';
17|     '^/PROPERTIES'[1][4] := '^/IN4.CV';
18|     '^/PROPERTIES'[1][5] := '^/IN5.CV';
19|     '^/PROPERTIES'[1][6] := '^/IN6.CV';
20|     '^/PROPERTIES'[1][7] := '^/IN7.CV';
21|     '^/PROPERTIES'[1][8] := '^/ADDITION.CV';
22|     J := 1;
23|     WHILE (J <= 8) DO
24|         IF ('^/PROPERTIES'[1][J] <= 0) THEN
25|             '^/PROPERTIES'[1][J] := '^/PROPERTIES'[2][J]';
26|         ENDIF;
27|         J := J+1;
28|     END_WHILE;
29|     IF ('^/INITIALIZE') THEN
30|         I := 2;
31|         WHILE (I <= 20) DO
32|             J := 1;
33|             WHILE (I <= 8) DO
34|                 '^/PROPERTIES'[I][J] := '^/PROPERTIES'[1][J]';
35|                 J := J+1;
36|             END_WHILE;
37|             I := I+1;
38|         END_WHILE;
39|         '^/INITIALIZE' := 0;
40|     ENDIF;
41|ENDIF;
42|REM Each execution the outlet properties are calculated based on level
43|I := 1;
44|WHILE (I <= 8) DO
45|     '^AVE_PROPERTY'[1][I] := 0.0;
46|     I := I+1;
47|END_WHILE;
48|IF ('^/LEVEL.CV' > 0.0) THEN
49|     I := 1;
50|     REM   Convert tank level from metric tons to kilograms
51|     WHILE (I <= 20) AND ('^/AVE_PROPERTY'[1][8] < ('^/LEVEL.CV' * 1000) DO
52|         J := 1;
53|         WHILE (J <=8) DO
54|             '^/AVE_PROPERTY'[1][J] := '^/AVE_PROPERTY'[1][J] + '^PROPERTIES'[I][J];
55|             J := J+1;
56|         END_WHILE;
57|         COUNT := I;
58|         I := I+1;
```

-continued

```
59|   END_WHILE;
60|   J := 1;
61|   WHILE (J <= 7) DO
62|       '^/AVE_PROPERTY'[1][J] := ('^/AVE_PROPERTY'[1][J]/COUNT);
63|       J := J+1;
64|   END_WHILE;
65|ENDIF;
66|IF ('^/ENTRY.CV' = 3) THEN
67|   COUNT := 1;
68|ENDIF;
69|'^/OUT1.CV':=('^/MIXING.CV'*'^/AVE_PROPERTY'[1][1]+[1.0-
  '^/MIXING.CV')*'^.PROPERTIES'[COUNT][1];
70|'^/OUT2.CV':=('^/MIXING.CV'*'^/AVE_PROPERTY'[1][2]+[1.0-
  '^/MIXING.CV')*'^.PROPERTIES'[COUNT][2];
71|'^/OUT3.CV':=('^/MIXING.CV'*'^/AVE_PROPERTY'[1][3]+[1.0-
  '^/MIXING.CV')*'^.PROPERTIES'[COUNT][3];
72|'^/OUT4.CV':=('^/MIXING.CV'*'^/AVE_PROPERTY'[1][4]+[1.0-
  '^/MIXING.CV')*'^.PROPERTIES'[COUNT][4];
73|'^/OUT5.CV':=('^/MIXING.CV'*'^/AVE_PROPERTY'[1][5]+[1.0-
  '^/MIXING.CV')*'^.PROPERTIES'[COUNT][5];
74|'^/OUT6.CV':=('^/MIXING.CV'*'^/AVE_PROPERTY'[1][6]+[1.0-
  '^/MIXING.CV')*'^.PROPERTIES'[COUNT][6];
75|'^/OUT7.CV':=('^/MIXING.CV'*'^/AVE_PROPERTY'[1][7]+[1.0-
  '^/MIXING.CV')*'^.PROPERTIES'[COUNT][7];
76|'^/STACK_POINTER':=COUNT;
```

Figure 8:
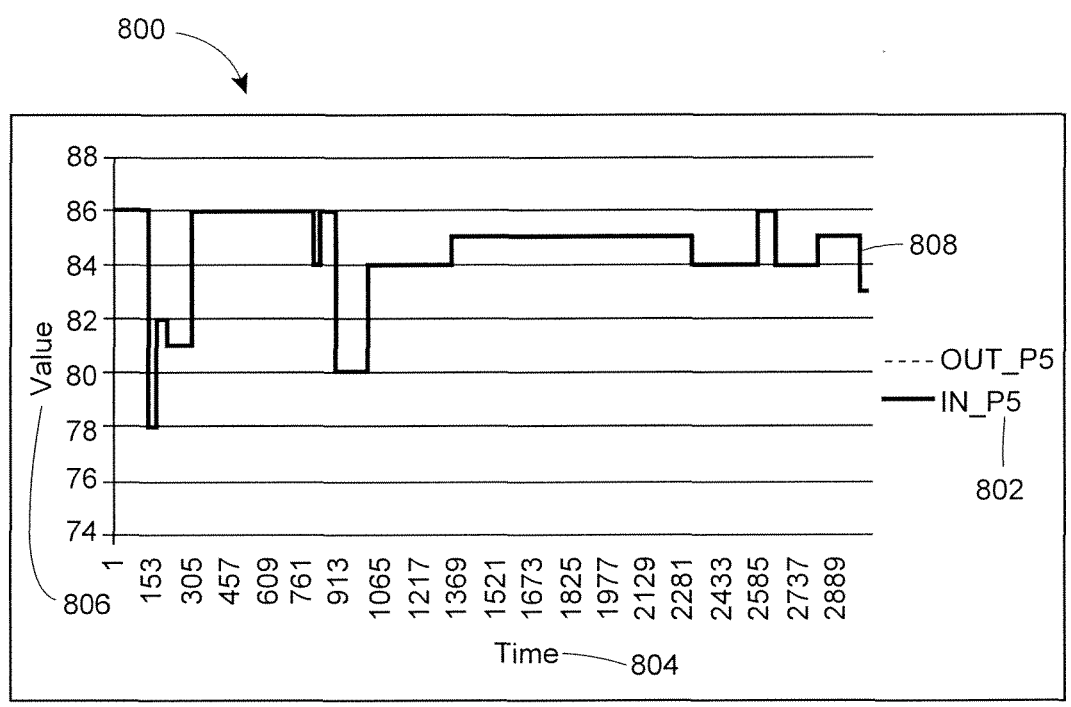
FIG. 8 illustrates a plot of an input and pump out property value over time.

To validate the model 115 and calculation of optimal mixing factors 612 to determine outlet properties 616, where m=0 (i.e., no mixing of feedstock zones) and assuming a plug flow without a previous zone in the tank 400, the outlet properties 616 should mirror the input properties 614. However, where m=1 (i.e., complete mixing of feedstock zones), the outlet properties 616 should generally follow the average property values in the tank 400. FIG. 8 illustrates an example graph 800 reflecting the model 115 incorporating one or more of the equations described above and assuming a mixing factor of zero (i.e., no mixing of zones) and a single zone level within the tank 400. As shown, for an outlet and inlet property "P5" 802, over a time period 804, the value 806 for the outlet property follows the known value of the inlet property as shown in the trending line 808 when the model 115 is configured correctly with the equations described herein. Alternately, where there are multiple zones existing within the tank 400 and the mixing factor is set to one (i.e., complete mixing), the trending line 808 would reflect the average values for the properties in the tank (i.e., average properties output parameter 622). Further, where there is only one zone in the tank 400 and a mixing factor of one, a graph for validation of the model 115 would include a trending line 808 similar to the line illustrated in FIG. 8 (i.e., the value 806 for the outlet property follows the known value of the inlet property).

Alternatively, model validation may include calculating the outlet property Q for several values of mixing factor m and a total mismatch error may be derived using lab results for the value of Q that may account for the outlet properties 502 for each value of a mixing factor 612. Using this method, a mixing factor producing the smallest total error may be selected for use within the model 115. To define a sub-optimal mixing factor, several mixing factor values may be used (e.g., 0.0, 0.25, 0.5, 0.75, and 1.0).

With reference to Equation 1, the value of the pump out property P may also be adjusted by a mixing factor m to account for the proximity of multiple zones to the pump out zone (i.e., the zone of feedstock currently being pumped out of the tank 400). For example, the feedstock that is delivered to the tank through a top inlet 404a affects the zones at the top of the tank to a greater degree than zones at the bottom of the tank, and vice versa. Dispersion, convection, and other factors of feedstock movement and composition influence the mixing factor and the mixing effect of one zone on another zone is inversely proportional to the distance between the zones. A correction may be calculated for two or more zones. For a multi-zone correction, a decreasing function of mixing in dependence of distance from the loaded zone is applied. It can be applied by using a linear, exponential or other function. The corrected properties for a new loaded zone may be described by Equation 9:

$$p_i^1(\text{corr}) = (1-m_1)p_i^1 + m_1 p_i^2 \qquad \text{(Equation 9)}$$

In a similar way, a correction for the adjacent zone may be calculated as described by Equation 10:

$$p_i^2(\text{corr}) = (1-m_1)p_i^2 + m_1 p_i^1 \qquad \text{(Equation 10)}$$

Multi zone correction may be similar to two zone correction applied for the zone pairs in the sequence: zones 1-2, 2-3, 3-4 etc. The number of corrected zones may be set arbitrarily, in any case it should be less than the number of material zones in the tank at the load.

The effect of multiple zones on the pump out zone may be decreasing in dependence of zone pair location in a linear fashion as described by Equation 11:

$$m_i = m_1 \frac{l-i+1}{l} \qquad \text{(Equation 11)}$$

where l is the number of zones that have previously been corrected for the effect of other zones, i is the index of zones i, i+1 where the correction is applied, i≤l, i≤n, n is the actual number of zones with feedstock in the storage tank, and $m_1$ is a corrective mixing factor defined as a fraction of mixing factor m (it is assumed that $m_1$=(0.1 to 0.5) m. If more than few zones are included into correction, exponential correction may better account for the mixing of the two adjacent zones as described by Equation 12:

$$m_i = m_1 e^{\frac{i-1}{l}} \qquad \text{(Equation 12)}$$

Zone correcting mixing factor $m_1$ may be smaller (e.g., two to five times) than the mixing factor m applied for calculating pump out properties. One reason for this assumption may be a difficulty in experimental identification of $m_1$ and possible overcorrection. The number of zones with the corrected properties l may be arbitrary as well (e.g., two to four zones as a default). Selecting a fixed value for $m_1$ and l may allow omitting the additional step of identifying those factors. Instead, the method may apply an identification procedure for defining only final mixing factors as done for the original model with uncorrected zones. Property calculation as in Equations 9 and 10 may assume the same weights of the adjacent zones. Different zone weights may introduce an additional calculation error.

Figure 9:
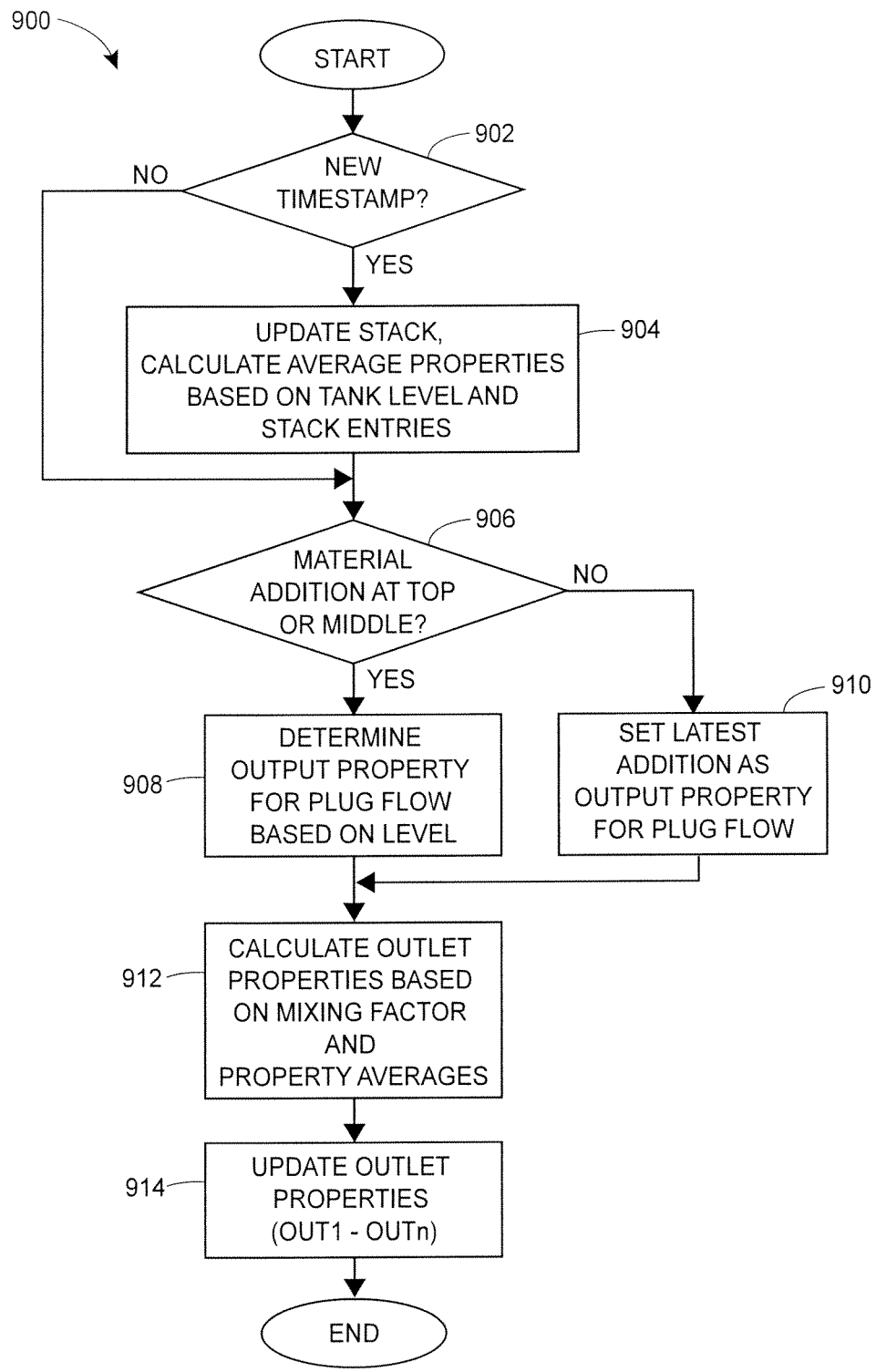
FIG. 9 illustrates a flow chart describing a method and system for multi-zone modeling to determine material properties in storage tanks.

FIG. 9 is a flowchart of an example method that may be carried out to implement the feedstock properties modeling module model 115 and the tank property calculation block 604 described above. The flow chart may generally describe a method 900 for determining feedstock material properties in mixer-less storage tanks. While the method 900 is described as including a plug flow-type inlet/outlet configuration, the method 900 may also be employed to support other types of tank configurations as herein described. The method 900 may include one or more functions or routines in the form of computer-executable instructions that are stored in a computer-readable memory and executed using a processor of a computing device. The routines may be included as part of the feedstock properties modeling module 115 (FIG. 1B).

At function 902, the module 115 may determine if new feedstock has been delivered to the storage tank 400 (FIG. 4). In some embodiments, the module 115 may include an instruction to query the stack 500 (FIG. 5) to determine if the time property 508 includes a value that is different than a value associated with the date time block 620 (FIGS. 6A and 6B). For example, as a new delivery of feedstock arrives in the storage tank 400, properties 502 for the new feedstock may be pushed onto the stack 500, including the time value 508. The new feedstock time value 508 may be compared to the value of the current date time external input parameter 620. A new timestamp value within the stack 500 may indicate delivery of new feedstock 420 having new properties 502.

If a delivery of feedstock 402 includes a new timestamp, function 904 may perform several calculations using the stack 500 and composite function block 600. In some embodiments, the function 904 may update the stack 500 and calculate an average value for each property 502 of the total feedstock 402 currently in the storage tank 400. The calculations performed by function 904 may be based on the tank level 608 and values 504 within the stack 500. If the delivery does not include a new timestamp, function 904 may be skipped.

At function 906, the module 115 may determine the position of the new feedstock within the tank 400. In some embodiments, the new feedstock may be delivered to various positions within the tank 400. For example, the new feedstock may be delivered at the top 404a, middle 404b, or bottom 404c of the tank 400. In plug flow configured storage tanks 400, delivery of the feedstock at the top 404a or middle 404b may indicate layering of the feedstock 402 within the tank 400 and the creation of a new feedstock zone on top of a previous feedstock zone. At function 908, where the new feedstock is delivered to the tank 400 at the top or middle, then the values of the properties for the feedstock being drawn out of the tank 500 may be based on the level 608 of the feedstock within the tank. For example, with reference to FIG. 4, an example tank 400 has existing feedstock at zone 408 and is configured for plug flow with an outlet at position 406c. New feedstock delivery may enter the tank 400 at inlet 404a or 404b and create a new feedstock zone 410. In this example, because there is one previous feedstock zone currently in the tank at the time of delivery (408), the feedstock that will be drawn out of the tank 400 will be based on that previous feedstock zone (or level) inside the tank, or feedstock zone 408, with some mixing between the previous zone 408 and the new zone 410. Thus, the function 908 may set the outlet properties 616 to the properties associated with the previous feedstock zone (i.e., feedstock zone 408). However, where the new feedstock is delivered to the bottom of the plug flow-configured tank, then no or very little mixing will occur between the zones and the new feedstock will be drawn directly out of the tank. Therefore, where the new feedstock is delivered to the bottom of the plug flow-configured tank, the function 910 may set the outlet properties 616 to the properties of the newly-delivered feedstock 402.

At function 912, the module may calculate the outlet properties 616 based on a mixing factor 612 and the output parameter 622 of the feedstock properties for the feedstock that is currently in the tank 400. In some embodiments, the function 912 may use one or more of the equations described herein to calculate a new outlet property 616 based on a mixing factor 612 and the average property values for the feedstock currently in the tank.

At function 914, the module 115 may store the outlet properties 616 calculated using function 912. In some embodiments, the outlet properties 616 may be stored in the composite function block 600.

After the feedstock leaves the storage tank 400 and the outlet properties 616 are calculated, the outlet feedstock may enter another process plant entity, for example, a reactor 407. Another module 410 may use the outlet properties 616 to calculate various properties for the feedstock that is present within the reactor 407. For example, the outlet properties 616 may change over time as new feedstock arrives and old feedstock is depleted. Thus, the module 410 may track and record the properties for the feedstock entering the reactor 407 to determine the composition of the feedstock within the reactor 407 at any given time.

The example method 900 of FIG. 9 may be carried out by a processor, a controller and/or any other suitable processing device. For example, the method 900 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 10). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the method 900 may be implemented using any combination(s) of ASIC(s), PLD(s), FPLD(s), discrete logic, hardware, firmware, etc.

Also, some or all of the example method 900 may instead be implemented using manual operations or as any combination of any of the foregoing techniques, for example, any combination of firmware, software, discrete logic and/or hardware. Furthermore, many other methods of implementing the example operations of FIG. 9 may be employed. For example, the order of execution of the functions may be changed, and/or one or more of the functions described may be changed, eliminated, sub-divided, or combined. Additionally, any or all of the example method 900 may be carried out sequentially and/or carried out in parallel by, for example, separate processing threads, processors, devices, discrete logic, circuits, etc.

The example method 900 models relationships between measured, calculated, and/or overall feedstock properties based on characteristics of a process control system. Multiple example methods 900 may be executed in parallel or series to model portions of a process control system and/or to model other process control systems.

Figure 10:
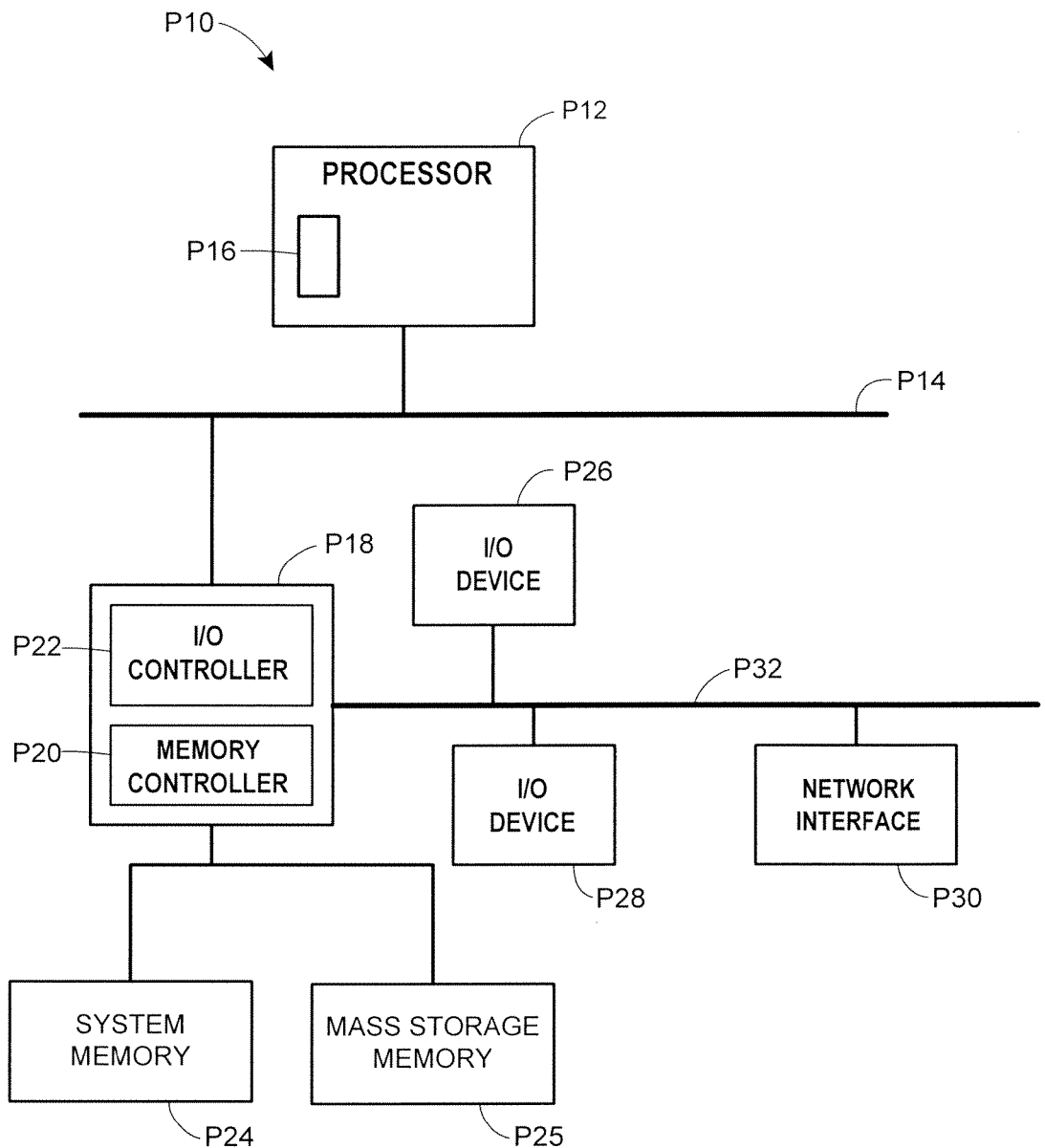
FIG. 10 illustrates a block diagram of an example processor system that may be used to implement the example method and system for multi-zone modeling to determine material properties in storage tanks described herein.

FIG. 10 is a block diagram of an example processor system P10 that may be used to implement the example methods and apparatus described herein. For example, processor systems similar or identical to the example processor system P10 may be used to implement the example OMS 102, the example batch data receiver 402, the example analytic processor 114, the example analytic process modeler 408, the example evaluation process modeler 410, the example process model generator 412, the example display manager 420, the example session controller 422, the example online data processor 116, the example in-plant access server 424, and/or the example web access server 428 of FIGS. 1 and/or 4. Although the example processor system P10 is described below as including a plurality of peripherals, interfaces, chips, memories, etc., one or more of those elements may be omitted from other example processor systems used to implement one or more of the example OMS 102, the example batch data receiver 402, the example analytic processor 114, the example analytic process modeler 408, the example evaluation process modeler 410, the example process model generator 412, the example display manager 420, the example session controller 422, the example online data processor 116, the example in-plant access server 424, and/or the example web access server 428.

As shown in FIG. 10, the processor system P10 includes a processor P12 that is coupled to an interconnection bus P14. The processor P12 includes a register set or register space P16, which is depicted in FIG. 10 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 10, the system P10 may be a multi-processor system and, thus, may include one or more additional processors that are identical or similar to the processor P12 and that are communicatively coupled to the interconnection bus P14.

The processor P12 of FIG. 10 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the OMS 102 (FIG. 2), the mass storage memory P25 may include a hard disk drive, an optical drive, a tape storage device, etc. Alternatively, if the example processor system P10 is used to implement the process model database 416 and/or the batch data database 406, the mass storage memory P25 may include a solid-state memory (e.g., a flash memory, a RAM memory, etc.), a magnetic memory (e.g., a hard drive), or any other memory suitable for mass storage in the process model database 416 and/or the batch data database 406.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 10 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for interne and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A computer-implemented method for determining feedstock material properties in a mixer-less storage tank of a process control plant, the method comprising:
    receiving, from a sensor disposed within the process control plant, a measured process variable associated with at least one of a feedstock or the mixer-less storage tank;
    applying, by a processor-implemented function block, feedstock property values of a previous feedstock zone to a new feedstock zone;
    establishing, by the processor-implemented function block, a pump out zone based on a storage tank level measurement relative to a tank outlet;
    calculating, by the processor-implemented function block, average feedstock property values for a total amount of feedstock within the storage tank;
    calculating, by the processor-implemented function block, a mixing factor for the pump out zone;
    calculating, by the processor-implemented function block, pump out feedstock property values for the pump out zone based on the average feedstock property values and the mixing factor;
    applying, by the processor-implemented function block, the pump out feedstock property values to the pump out zone of the storage tank to determine feedstock material properties of the pump out feedstock leaving the mixer-less storage tank;
    determining, by the processor-implemented function block, a process correction based upon the determined feedstock material properties of the pump out feedstock, wherein the process correction indicates an adjustment to one or more aspects of the operation of the process control plant; and
    causing, by the processor-implemented function block, the process correction to be implemented within the process control plant to adjust the operation of the one or more aspects of the process control plant;
    wherein the feedstock in the pump out zone is partially mixed with other feedstock in the storage tank, and wherein at least one of the storage tank level measurement, the average feedstock property values, or the mixing factor is based at least in part upon the received measured process variable.

2. The computer-implemented method of claim 1, wherein establishing a pump out zone based on a storage tank level measurement relative to a tank outlet includes updating a stack.

3. The computer-implemented method of claim 1, wherein the tank outlet includes a plug flow.

4. The computer-implemented method of claim 3, wherein establishing a pump out zone based on a storage tank level measurement relative to a tank outlet includes determining a position of the new feedstock zone within the storage tank.

5. The computer-implemented method of claim 4, wherein if the new feedstock zone is in the top position or middle position, the pump out feedstock property values for the pump out zone are based on a level of the total feedstock within the storage tank.

6. The computer-implemented method of claim 4, wherein if the new feedstock zone is in a bottom position, the pump out feedstock property values for the pump out zone include the feedstock property values of the new feedstock zone.

7. The computer-implemented method of claim 1, further comprising updating a data structure with the calculated pump out feedstock property values.

8. The computer-implemented method of claim 1, wherein the mixing factor includes a slope of a best fit regression line for a scattered plot.

9. The computer-implemented method of claim 8, wherein the scattered plot includes a lab-derived feedstock property value ($Q_{lab}$) minus the feedstock property value with no mixing (P) versus the feedstock property value with complete mixing (A) minus the feedstock property value with no mixing (P).

10. The computer-implemented method of claim 1, wherein calculating pump out feedstock property values (Q) includes:

$$Q=(1-m)P+mA$$

wherein m includes the mixing factor, P includes a feedstock property value with no mixing, and A includes the average of the feedstock property value.

11. A computer-implemented method for calculating pump out feedstock material properties in a mixer-less storage tank of a batch process, the method comprising:
    receiving, from a sensor disposed within the process control plant, a measured process variable associated with at least one of a feedstock or the mixer-less storage tank;
    calculating, by a processor-implemented function block, an average for a feedstock property value for a total amount of feedstock within the storage tank, the total amount of feedstock including feedstock within a new feedstock zone;
    determining, by the processor-implemented function block, a position of the new feedstock zone within the tank, the position corresponding to an inlet position of the storage tank;

determining, by the processor-implemented function block, a position of a pump out zone within the tank, the pump out zone corresponding to an outlet position of the storage tank;

calculating, by the processor-implemented function block, a pump out feedstock property value based on a slope of a best fit regression line for a scattered plot of a lab-derived value of the feedstock property value ($Q_{lab}$) minus the feedstock property value with no mixing (P) versus the feedstock property value with complete mixing (A) minus the feedstock property value with no mixing (P); and applying, by the processor-implemented function block, the pump out feedstock property value to the pump out zone within the tank to determine feedstock material properties of the pump out feedstock leaving the mixer-less storage tank;

determining, by the processor-implemented function block, a process correction based upon the determined feedstock material properties of the pump out feedstock, wherein the process correction indicates an adjustment to one or more aspects of the operation of the process control plant; and causing, by the processor-implemented function block, the process correction to be implemented within the process control plant to adjust the operation of the one or more aspects of the process control plant;

wherein at least one of the average feedstock property value, the position of the new feedstock zone, the position of the pump out zone, or the pump out feedstock property value is based at least in part upon the received measured process variable.

12. The computer-implemented method for calculating pump out feedstock material properties of claim 11, wherein the storage tank is a plug flow storage tank.

13. The computer-implemented method for calculating pump out feedstock material properties of claim 11, wherein the inlet position includes one of a top position, a middle position, and a bottom position.

14. The computer-implemented method for calculating pump out feedstock material properties of claim 11, wherein the outlet position includes one of a top position, a middle position, and a bottom position.

15. The computer-implemented method for calculating pump out feedstock material properties of claim 11, wherein calculating the pump out feedstock property value (Q) includes:

$$Q=(1-m)P+mA$$

wherein m includes the slope, P includes the feedstock property value with no mixing, and A includes the average of the feedstock property value.

16. The computer-implemented method for calculating pump out feedstock material properties of claim 11, wherein the feedstock property value includes one or more of a pH balance, reactivity, toxicity, a concentration, a density, a molecular weight, and a viscosity.

17. The computer-implemented method for calculating pump out feedstock material properties of claim 11, wherein a slope value of zero corresponds to a completely unmixed feedstock property and a slope value of one corresponds to a completely mixed feedstock property.

18. The computer-implemented method for calculating pump out feedstock material properties of claim 11, wherein an effect of multiple other feedstock zones within the storage tank on the pump out zone includes an exponential correction for the mixing factor $m_i$ at pump out zone i:

$$m_i = m_1 e^{\frac{i-1}{l}}$$

where l includes a number of feedstock zones that have previously been corrected for the effect of multiple other zones, i includes an index of zones i,i+1 where the effect is applied, i≤l, and i≤n, n includes a number of other feedstock zones currently in the storage tank.

19. A computer device for determining feedstock material properties in a mixer-less storage tank of a process control plant, the computer device comprising:

one or more processors;

one or more sensors communicatively connected to the one or more processors;

a computer readable memory communicatively coupled to the one or more processors, the computer readable memory having a computer implemented application stored thereon that is executed by the one or more processors, the application including:

a first routine including instructions executed by a processor that detect a new feedstock delivery to the storage tank;

a second routine including instructions executed by a processor that update a data structure with a feedstock property value corresponding to the new feedstock delivery and calculate an average for the feedstock property value for a total amount of feedstock within the storage tank, the total amount of feedstock including the new feedstock delivery within a new feedstock zone;

a third routine including instructions executed by a processor that determine a position of the new feedstock zone and a position of a pump out zone within the tank;

a fourth routine including instructions executed by a processor that calculate a pump out feedstock property value (Q) based on a mixing factor of the pump out zone, the mixing factor including slope of a best fit regression line for a scattered plot of a lab-derived value of the feedstock property value ($Q_{lab}$) minus the feedstock property value with no mixing (P) versus the feedstock property value with complete mixing (A) minus the feedstock property value with no mixing (P);

a fifth routine including instructions executed by a processor that apply the pump out feedstock property value to the pump out zone within the tank to determine feedstock material properties of the pump out feedstock leaving the mixer-less storage tank; and a sixth routine including instructions executed by a process that determine a process correction based upon the determined feedstock material properties of the pump out feedstock, wherein the process correction indicates an adjustment to one or more aspects of the operation of the process control plant, and cause the process correction to be implemented within the process control plant to adjust the operation of the one or more aspects of the process control plant;

wherein at least one of the feedstock property value, the average for the feedstock property value, the total amount of feedstock, the position of the new feedstock zone, the position of the pump out zone, or the mixing factor is based at least in part upon data received from the one or more sensors.

20. The computer device of claim 19, wherein the second routine includes further instructions executed by a processor for updating a stack.

21. The computer device of claim 19, wherein if the new feedstock zone is in a top position or middle position of the storage tank, the fourth routine includes further instructions executed by a processor to determine pump out feedstock property values for the pump out zone that are based on a level of the total feedstock within the storage tank.

22. The computer device of claim 19, wherein if the new feedstock zone is in a bottom position of the storage tank, fourth routine includes further instructions executed by a processor to determine pump out feedstock property values for the pump out zone that include the feedstock property values of the new feedstock zone.

23. The computer device of claim 19, wherein the storage tank is a plug flow storage tank.

24. The computer device of claim 19, wherein the fourth routine that calculates the pump out feedstock property value (Q) includes further instructions executed by a processor to determine:

$$Q=(1-m)P+mA$$

wherein m includes the slope, P includes the feedstock property value with no mixing, and A includes the average of the feedstock property value.

25. The computer device of claim 19, wherein the feedstock property value includes one or more of a pH balance, reactivity, toxicity, a concentration, a density, a molecular weight, and a viscosity.

26. The computer device of claim 24, wherein a slope value of zero corresponds to a completely unmixed feedstock property and a slope value of one corresponds to a completely mixed feedstock property.

* * * * *